(12) United States Patent
Goenka

(10) Patent No.: US 9,821,630 B2
(45) Date of Patent: Nov. 21, 2017

(54) MODULAR AIR CONDITIONING SYSTEM

(71) Applicant: Halla Visteon Climate Control Corp., Daejeon (KR)

(72) Inventor: Lakhi Nandlal Goenka, Ann Arbor, MI (US)

(73) Assignee: HANON SYSTEMS, Daejeon-si (KR)

( * ) Notice: Subject to any disclaimer, the term of this patent is extended or adjusted under 35 U.S.C. 154(b) by 455 days.

(21) Appl. No.: 14/485,861

(22) Filed: Sep. 15, 2014

(65) Prior Publication Data

US 2016/0075208 A1     Mar. 17, 2016

(51) Int. Cl.
| | |
|---|---|
| *B60H 1/00* | (2006.01) |
| *F24F 5/00* | (2006.01) |
| *F25D 16/00* | (2006.01) |
| *F25B 25/00* | (2006.01) |
| *B60H 1/02* | (2006.01) |

(52) U.S. Cl.
CPC ............ *B60H 1/005* (2013.01); *F24F 5/0017* (2013.01); *F25B 25/005* (2013.01); *F25D 16/00* (2013.01); *B60H 1/0005* (2013.01); *B60H 1/02* (2013.01); *F25B 25/00* (2013.01); *Y02E 60/147* (2013.01)

(58) Field of Classification Search
CPC .............................. B60H 1/005; F25B 25/005
See application file for complete search history.

(56) References Cited

U.S. PATENT DOCUMENTS

| | | | | | |
|---|---|---|---|---|---|
| 5,277,038 | A | * | 1/1994 | Carr ................... | B60H 1/00492 165/10 |
| 5,407,130 | A | * | 4/1995 | Uyeki ................ | B60H 1/00492 165/42 |
| 5,408,843 | A | * | 4/1995 | Lukas ................. | B60H 1/3227 62/244 |
| 5,553,662 | A | * | 9/1996 | Longardner ....... | B60H 1/00492 165/10 |
| 6,260,376 | B1 | * | 7/2001 | Khelifa .................. | F25D 16/00 62/430 |
| 6,691,527 | B2 | | 2/2004 | Bureau et al. | |
| 6,854,513 | B2 | | 2/2005 | Shirota et al. | |

(Continued)

FOREIGN PATENT DOCUMENTS

| | | |
|---|---|---|
| JP | 2004142551 A | 5/2004 |
| KR | 20120024187 A | 3/2012 |
| KR | 20120024189 A | 3/2012 |

*Primary Examiner* — Etsub Berhanu
*Assistant Examiner* — Amanda P Setiawan
(74) *Attorney, Agent, or Firm* — Shumaker, Loop & Kendrick, LLP; James D. Miller

(57) ABSTRACT

A thermal energy storage system of a vehicle is disclosed. The thermal energy storage system includes a refrigerant circuit conveying a refrigerant therethrough. The refrigerant circuit includes an evaporator receives a flow of the refrigerant and a flow of air. The thermal energy storage system also includes a coolant circuit conveying a coolant therethrough. The coolant circuit includes a coolant heat exchanger disposed downstream from the evaporator with respect to a direction of the flow of air through the evaporator and an auxiliary heat exchanger receiving a flow of the coolant. The thermal energy storage system further includes a cold storage device in thermal communication with the coolant circuit and a WCAC in fluid communication with the auxiliary heat exchanger.

14 Claims, 2 Drawing Sheets

(56) References Cited

U.S. PATENT DOCUMENTS

| | | | |
|---|---|---|---|
| 2007/0175230 A1* | 8/2007 | Plummer | B60H 1/3226 |
| | | | 62/236 |
| 2009/0041441 A1* | 2/2009 | Marechal | F24H 3/004 |
| | | | 392/357 |
| 2009/0293521 A1* | 12/2009 | Major | B60H 1/005 |
| | | | 62/228.1 |
| 2010/0116485 A1 | 5/2010 | Hiyama | |
| 2011/0023518 A1 | 2/2011 | Amaya et al. | |
| 2013/0263829 A1 | 10/2013 | Demots et al. | |
| 2014/0245999 A1* | 9/2014 | Gruber | F04D 25/024 |
| | | | 123/568.12 |

* cited by examiner

MODULAR AIR CONDITIONING SYSTEM

FIELD OF THE INVENTION

The invention relates to a thermal energy storage system of a vehicle for transferring thermal energy from a refrigerant circuit of an HVAC system of the vehicle to a coolant circuit of the vehicle.

BACKGROUND OF THE INVENTION

As commonly known, a vehicle typically includes a climate control system which maintains a temperature within a passenger compartment of the vehicle at a comfortable level by providing heating, cooling, and ventilation. Comfort is maintained in the passenger compartment by an integrated mechanism referred to in the art as a heating, ventilating and air conditioning (HVAC) system. The HVAC system conditions air flowing therethrough and distributes the conditioned air throughout the passenger compartment.

Typically, in operation, a compressor of the HVAC system provides a flow of fluid having a desired temperature to an evaporator disposed in the HVAC system to condition the air. The compressor is generally driven by a fuel-powered engine of the vehicle, such as an internal combustion engine. To enhance fuel efficiency, stop-start engine systems can be employed with vehicles that include an internal combustion engine. In stop-start engine systems, the engine stops operating during vehicle stops or idle mode, such as during a traffic light stop, for example. When the engine stops operating, the compressor of the HVAC system also stops operating. Accordingly, stoppage of the engine stops the operation of the compressor of the HVAC system. The stoppage of the operation of the compressor affects a temperature of the passenger compartment causing thermal discomfort, especially when the ambient temperature is higher.

In order to address thermal discomfort while maintaining efficiency, thermal storage systems are employed to condition the air flowing through the HVAC system when the fuel-powered engine is not in operation. The thermal storage systems may employ a phase change material (PCM) that absorbs heat when the fuel-powered engine is not operating. When the fuel-powered engine is operating, thermal energy is removed from the PCM and the phase change material is charged. Examples of thermal storage systems are described in U.S. Pat. No. 6,854,513 and U.S. Pat. No. 6,691,527.

Additionally, coolant circuits of an engine may be employed with an evaporator of the HVAC system to store thermal energy in a thermal energy storage tank. For example, South Korean Pat. Appl. Pub. No. 10-2012-0024187 and South Korean Pat. Appl. Pub. No. 10-2012-0024189 disclose a cold storage system including an evaporator having a cooling water passage for receiving engine cooling water and a thermal energy storage tank in heat exchange communication with the engine cooling water. Furthermore, Japanese Pat. Appl. Pub. No. 2004-142551 discloses a thermal energy storage system in which cooling water is received by an evaporator to store thermal energy.

Additionally, a vehicle is commonly known to include turbochargers and superchargers to boost the engine of the vehicle by compressing air prior to being received by cylinders of the engine. When the air is compressed by the turbocharger or supercharger, the air is heated and a pressure of the air is increased. However, it is desirable for the air entering the engine to be cooled after exiting the turbocharger or supercharger because cooler air has an increased density that improves the efficiency of the engine. In certain situations, the cooling of the air may also facilitate engine management and eliminate the possibility of pre-detonation of the air and a fuel prior to a timed spark ignition and militate against excessive wear or heat damage to an engine block of the engine. Water-cooled charge air coolers (WCAC) can be used in the vehicle to cool the air that has been compressed by the turbocharger or supercharger such as described in U.S. Pat. Appl. Pub. No. 2011/0023518, hereby incorporated by reference herein in its entirety.

It is desirable to provide a thermal energy storage system of a vehicle and method of operating the same wherein an effectiveness and efficiency of an HVAC system of the vehicle, an effectiveness and efficiency of a WCAC of the vehicle, and a fuel economy of the vehicle are maximized while minimizing complexity and cost.

SUMMARY OF THE INVENTION

In accordance and attuned with the present invention a thermal energy storage system of a vehicle and method of operating the same wherein an effectiveness and efficiency of an HVAC system of the vehicle, an effectiveness and efficiency of a WCAC of the vehicle, and a fuel economy of the vehicle are maximized while minimizing complexity and cost has surprisingly been discovered.

According to an embodiment of the disclosure a thermal energy storage system of a vehicle is disclosed. The thermal energy storage system includes a refrigerant circuit conveying a refrigerant therethrough. The refrigerant circuit includes an evaporator receiving a flow of the refrigerant and a flow of air. The thermal energy storage system also includes a coolant circuit conveying a coolant therethrough. The coolant circuit includes a coolant heat exchanger disposed downstream from the evaporator with respect of a direction of the flow of air through the evaporator and an auxiliary heat exchanger receiving a flow of the coolant. The thermal energy storage system further includes a cold storage device in heat exchange communication with the coolant circuit and a WCAC in fluid communication with the auxiliary heat exchanger.

According to another embodiment of the disclosure a method for operating the thermal energy storage system of a vehicle is disclosed. The method includes the steps of providing a refrigerant circuit conveying a refrigerant therethrough and disposing a coolant heat exchanger downstream from the evaporator in respect of a direction of the flow of air through the evaporator. The refrigerant circuit includes an evaporator receiving a flow of the refrigerant and a flow of air. The coolant heat exchanger receives a flow of coolant. The method additionally includes the steps of transferring heat between the air and the coolant received by the coolant heat exchanger and providing a coolant circuit in fluid communication with the coolant heat exchanger. The coolant circuit includes a heater core, an engine, and an auxiliary heat exchanger. The method further includes the steps of disposing a WCAC in fluid communication with the auxiliary heat exchanger and directing the coolant to flow through at least one of the auxiliary heat exchanger, the heater core, and the engine.

According to a further embodiment of the disclosure a method for operating the thermal energy storage system of a vehicle is disclosed. The method includes the steps of providing a refrigerant circuit conveying a refrigerant therethrough and disposing a coolant heat exchanger downstream from the evaporator in respect of a direction of the flow of air through the evaporator. The refrigerant circuit includes an evaporator receiving a flow of the refrigerant and a flow of air. The coolant heat exchanger receives a flow of coolant. The method additionally includes the steps of transferring heat between the air and the coolant received by the coolant heat exchanger and providing a coolant circuit in fluid communication with the coolant heat exchanger. The coolant circuit includes a heater core, an engine, and an auxiliary heat exchanger. The method further includes the steps of disposing a WCAC in fluid communication with the auxiliary heat exchanger and a cold storage device in heat exchange communication with a portion of the coolant circuit and directing the coolant to flow through at least one of the auxiliary heat exchanger, the portion of the coolant circuit in heat exchange communication with the cold storage device the heater core, and the engine.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawing which.

DETAILED DESCRIPTION OF THE INVENTION

Figure 1:
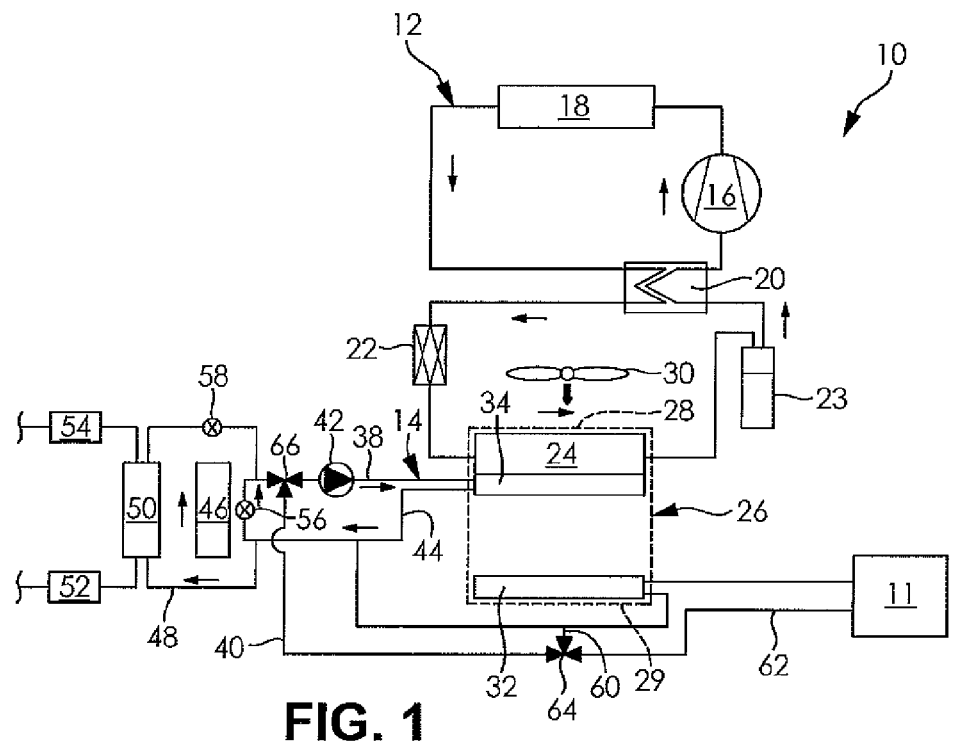
FIG. 1 is a schematic flow diagram of an HVAC thermal energy storage system operating in a cooling mode according to an embodiment of the present disclosure.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical. Except where otherwise expressly indicated, all numerical quantities in this description are to be understood as modified by the word "about" in describing the broadest scope of the technology.

FIGS. 1-4 illustrate heating, ventilating, and air conditioning (HVAC) thermal energy transfer system 10 of a vehicle according to an embodiment of the disclosure. The vehicle has a fuel powered engine 11 such as an internal combustion engine. The HVAC thermal energy transfer system 10 includes a refrigerant circuit 12 and a coolant circuit 14 of a vehicle (not shown).

The refrigerant circuit 12 is a refrigeration circuit used to provide heating, ventilation, and air conditioning for a passenger compartment of the vehicle. The refrigerant circuit 12 conveys a refrigerant therethrough. The refrigerant can be any refrigerant such as R134a, HFO-1234yf, AC-5, AC-6, and $CO_2$, for example.

The refrigerant circuit 12 includes a compressor 16 typically driven by a belt of the engine 11 of the vehicle to compress the refrigerant, a condenser 18 to condense the refrigerant, an internal heat exchanger 20 configured to transfer heat between the refrigerant at high pressure and the refrigerant at low pressure, an expansion valve 22 for expanding the refrigerant, and an evaporator 24 configured to transfer heat between air and the refrigerant. The refrigerant circuit 12 can further include other components of a refrigerant circuit 12 now known or later developed such as an accumulator 23, for example.

The evaporator 24 is disposed in a hollow HVAC case or housing 26 to control a temperature of the passenger compartment. The housing 26 includes an inlet 28 for receiving a flow of air and an outlet 29 for conveying the air to the passenger compartment. A fan 30 is disposed adjacent the inlet 28 of the housing 26 for conveying the air through the housing 26 and the evaporator 24. The evaporator 24 is a multi-layer fin and tube thermal energy exchanger configured to receive the flow of air through the housing 26 as known in the art. In certain embodiments, the evaporator 24 includes two layers of fin and tubes arranged substantially perpendicular to the direction of the flow of air through the housing 26. However, other evaporator arrangements and additional or fewer layers can also be employed as desired. A heater core 32 is disposed in the housing 26 downstream of the evaporator 24 with respect to the flow of air through the housing 26 to heat the passenger compartment.

A coolant heat exchanger 34 is disposed downstream of the evaporator 24 with respect of the flow of air through the housing 26. The coolant heat exchanger 34 can be any heat exchanger configured to receive a flow of coolant and transfer heat between the air flowing through the housing 26 and the coolant received by the coolant heat exchanger 34. In a non-limiting example, the coolant heat exchanger 34 can be a one layer tube and fin thermal energy exchanger. However, other heat exchanger arrangements and additional layers can also be employed as desired. For example, the coolant heat exchanger can be a coolant tank or a chiller having coils for receiving the coolant. In certain embodiments, the coolant heat exchanger 34 is integrally formed with the evaporator 24 as an additional layer of fin and tubes. In other embodiments, the coolant heat exchanger 34 is separate from the evaporator 24 and disposed adjacent the evaporator 24. For example, the coolant heat exchanger 34 can be adjacent the evaporator 24 and directly abutting the evaporator 24.

The coolant heat exchanger 34 is in fluid communication with the coolant circuit 14. The coolant circuit 14 conveys coolant therethrough. The coolant can be any coolant now known or later developed such as water, glycol, or a combination of both, for example. The coolant circuit 14 is an engine coolant circuit known for cooling the engine 11 of the vehicle. The coolant circuit 14 includes a thermal storage loop 38 and an engine bypass loop 40. The thermal storage loop 38 includes a fluid mover 42 for causing the coolant to flow through the coolant circuit 14. The fluid mover 42 can be a pump or compressor, for example. In a non-limiting example, the fluid mover 42 is an electric pump. While not shown, it is understood the coolant circuit 14 can be in fluid communication with other components of an engine coolant circuit such as a radiator, a thermostat, and a pump for conveying coolant therethrough. Additionally, the coolant circuit 14 can include any other control devices, hoses, expansion devices, or any other engine coolant circuit component as desired.

A first segment 44 of the thermal storage loop 38 is in heat exchange communication with a cold storage device 46. In certain embodiments, the cold storage device 46 is in fluid communication with the thermal storage loop 38. However, the thermal storage loop 38 can be separate from the cold storage device 46 and adjacent thereto. The cold storage device 46 can be any latent heat storage device for transferring heat between the cold storage device 46 and the coolant flowing through the coolant circuit 14. In certain embodiments, the cold storage device 46 can be a heat exchanger containing a phase change material (PCM) such as organic and inorganic eutectic materials, hydrated salts, paraffins and fatty acids, or any other substance capable of high latent heat storage as well as high thermal conductivity. However, in other embodiments the cold storage device can be a liquid-liquid chiller such as an absorption chiller or any other heat exchanger configured for latent heat storage as desired, for example.

A second segment 48 of the thermal storage loop 38 is in fluid communication with an auxiliary heat exchanger 50. As illustrated, the auxiliary heat exchanger 50 is also in fluid communication with a water-cooled charge air cooler (WCAC) 52. The WCAC 52 cools a charge air flowing through a charge air circuit of the vehicle before being drawn into a plurality of cylinders (not shown) of the engine 11 such as described and illustrated in U.S. Pat. Appl. Pub. No. 2013/0263829 hereby incorporated herein by reference in its entirety.

The WCAC 52 receives a flow of a coolant from a coolant source 54 to transfer heat from the coolant received by the WCAC 52 to the charge air flowing through the WCAC 52. For example, the coolant source 54 can be the coolant circuit 14, including the radiator (not shown), the thermostat (not shown), and the pump (not shown). According to this example, the WCAC 52 is in fluid communication with the coolant circuit 14. However, the coolant source 54 can be a separate circuit or system for conveying coolant to the WCAC 52 in fluid communication with the engine 11 or separate from the engine 11, as desired. The auxiliary heat exchanger 50 is disposed upstream of the WCAC 52 with respect to the flow coolant through the WCAC 52. The auxiliary heat exchanger 50 is a coolant-to-coolant heat exchanger configured to transfer heat from the coolant being conveyed to the WCAC 52 to the coolant flowing through the second segment 48 of the coolant circuit 14.

A first valve 56 is disposed in the first segment 44 of the thermal storage loop 38 to control the flow of coolant through a portion of the coolant circuit 14 in heat exchange communication with the cold storage device 46 to the cold storage device 46. A second valve 58 is disposed in the second segment 48 of the thermal storage loop 38 to control the flow of coolant to the auxiliary heat exchanger 50. It is understood that more or fewer valves may be used as desired to control the flow of coolant to the portion of the coolant circuit 14 in heat exchange communication with the cold storage device 46 to the cold storage device 46, the auxiliary heat exchanger 50, and through the thermal storage loop 38, as desired.

The engine bypass loop 40 includes the coolant heat exchanger 34, the heater core 32, the engine 11, and the fluid mover 42. The engine bypass loop 40 is configured to bypass the second segment 48 of the thermal storage loop 38. The heater core 32 is disposed upstream of the engine 11 with respect of a direction of the flow of coolant through the engine bypass loop 40. The engine bypass loop 40 further includes a bypass 60 for forming a secondary engine bypass loop 62 fluidly separate from the thermal storage loop 38. A first flow diverter 64 is disposed in the engine bypass loop 40 to control the flow of coolant through the bypass 60 and through the engine bypass loop 40. In the embodiment illustrated, the first flow diverter 64 is a three-way valve configured to provide fluid communication between the thermal storage loop 38 and the engine bypass loop 40 or to direct the flow of coolant through the secondary engine bypass loop 62. However, in another embodiment, the first flow diverter 64 can be a plurality of valves to control the flow of coolant through the bypass 60 and through the engine bypass loop 40.

A second flow diverter 66 is disposed in the coolant circuit 14 to control the flow of coolant through the thermal storage loop 38 and through the engine bypass loop 40. In the embodiment illustrated, the second flow diverter 66 is a three-way valve to allow the engine bypass loop 40 to bypass the second segment 48 of the thermal storage loop 38 or control the flow of coolant through the thermal storage loop 38. In the embodiment illustrated, the second flow diverter 66 is disposed intermediate the fluid mover 42 and the first valve 56 of the thermal storage loop 38 and disposed intermediate the first flow diverter 64 and the fluid mover 42 of the engine bypass loop 40. However, in another embodiment, the second flow diverter 64 can be a plurality of valves to allow the engine bypass loop 40 to bypass the second segment 48 of the thermal storage loop 38 or control the flow of coolant through the thermal storage loop 38.

In operation, the HVAC thermal energy storage system 10 conditions the air by heating, cooling, or dehumidifying the air, and providing the conditioned air to the passenger compartment. The HVAC thermal energy storage system 10 operates in a cooling mode, a heating mode, and a mixed-mode. The cooling mode is employed to cool the passenger compartment where the ambient air is warm, for example. The heating mode is employed to warm the passenger compartment where the ambient air is cold, for example. The mixed-mode is employed to dehumidify the passenger compartment where the ambient air is cool and contains a high level of relative humidity.

FIG. 1 illustrates the HVAC thermal energy storage system 10 operating in the cooling mode according to an embodiment of the disclosure. When the engine 11 of the vehicle is operating, the refrigerant circuit 12 is operating to condition the air conveyed through the housing 26 to cool the passenger compartment. The refrigerant is conveyed through the components of the refrigerant circuit 12 (the compressor 16, the condenser 18, the internal heat exchanger 20, the expansion valve 22, the evaporator 24, the accumulator 23) in a direction indicated by the arrows. Concurrently, the fan 30 causes air to be conveyed through the housing 26 to the passenger compartment. The evaporator 24 transfers heat from the air flowing through the housing 26 to the refrigerant flowing through the refrigerant circuit 12.

Concurrently, while the engine 11 is operating, the coolant circuit 14 is operating. The fluid mover 42 causes the coolant to flow through the coolant circuit 14. A direction of the flow of coolant is indicated by arrows. The coolant heat exchanger 34 transfers heat between the air cooled by the evaporator 24 and the coolant flowing through the coolant circuit 14 to cool the coolant flowing through the coolant circuit 14. The first flow diverter 64 and the second flow diverter 66 are configured to militate against the coolant flowing through the engine bypass loop 40.

In certain embodiments, the first valve 56 of the coolant circuit 14 is open and the second valve 58 of the coolant circuit 14 can be alternately open. The first valve 56 opens to allow the coolant to flow through the first segment 44 of the coolant circuit 14 to be in heat exchange communication with the cold storage device 46. The coolant in heat exchange communication with the cold storage device 46 causes thermal energy to be removed from the cold storage device 46. The second valve 58 is open to allow the auxiliary heat exchanger 50 to receive the coolant flowing through the second segment 48 of the coolant circuit 14. The auxiliary heat exchanger 50 transfers heat from the coolant conveyed from the coolant source 54 to the WCAC 52 to the coolant conveyed through the coolant circuit 14 to cool the coolant received by the WCAC 52. The WCAC 52 uses the cooled coolant to cool the charge air received therein. In certain embodiments, the first valve 56 can be open and the second valve 58 can be closed or the first valve 56 can be closed and the second valve 58 can be open to control the flow of coolant through the first segment 44 and the second segment of the coolant circuit 14, as desired.

During the cooling mode, when the engine 11 is not operating such as during a vehicle stop, a warm flow of air is conveyed through the evaporator 24. The cold storage device 46 is employed to absorb the heat from and cool the coolant flowing through the coolant circuit 14. The coolant that has been cooled by the cold storage device 46 is conveyed to the coolant heat exchanger 34 to transfer heat from the air to the coolant flowing therethrough to cool the passenger compartment.

Figure 2:
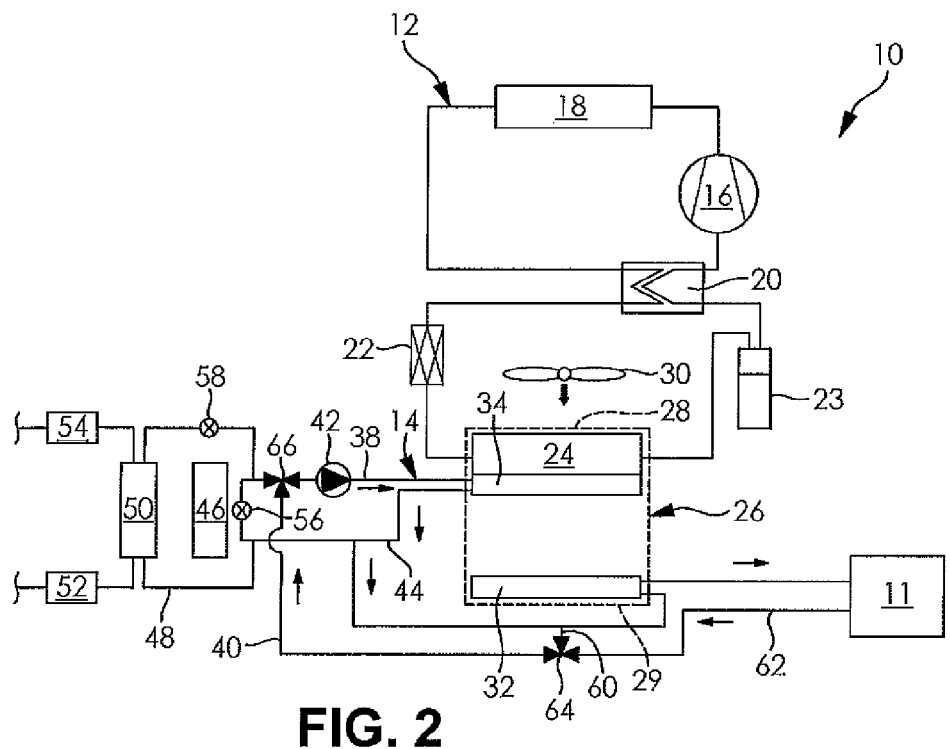
FIG. 2 is a schematic flow diagram of the HVAC thermal energy storage system of FIG. 1 operating in a first heating mode.

FIG. 2 illustrates the thermal energy storage system 10 operating in the heating mode according to an embodiment of the disclosure. In the heating mode, the refrigerant circuit 12 is idle. The first valve 56 of the coolant circuit 14 is closed to militate against the cold storage device 46 absorbing heat from the coolant flowing through the coolant circuit 14. The second valve 58 of the coolant circuit 14 is closed to militate against the coolant flowing through the second segment 48 of the coolant circuit 14. The first flow diverter 64 and the second flow diverter 66 are configured to convey the coolant through the fluid mover 42, the coolant heat exchanger 34, the heater core 32, the engine 11, and back through the fluid mover 42, in a direction indicated by the arrows. Heat from the engine 11 is used to heat the coolant conveyed to the coolant heat exchanger 34 and the heater core 32. Concurrently, the fan 30 causes the air to be conveyed through the housing 26 to the passenger compartment. The coolant heat exchanger 34 and the heater core 32 transfer heat from the coolant flowing through the coolant circuit 14 to the air flowing through the housing 26.

Figure 3:
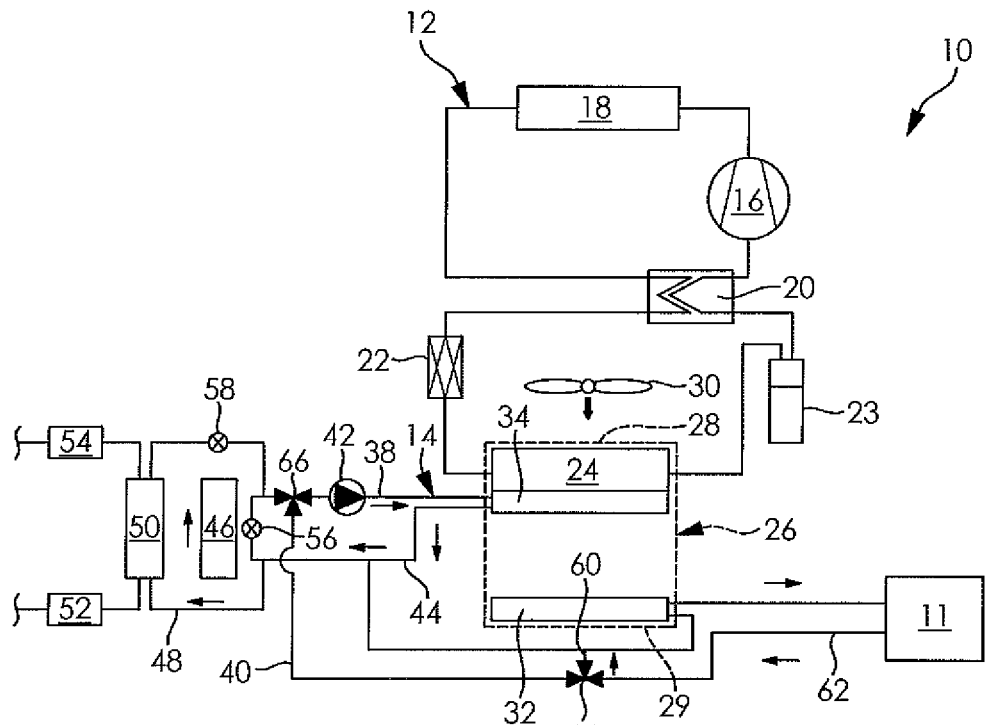
FIG. 3 is a schematic flow diagram of an HVAC thermal energy storage system of FIG. 2 operating in a second heating mode.

FIG. 3 illustrates the thermal energy storage system 10 operating in the heating mode according to another embodiment of the disclosure. In the heating mode according to this embodiment, the refrigerant circuit 12 is idle. The first valve 56 of the coolant circuit 14 is closed to militate against heat exchange communication between the cold storage device 46 and the coolant circuit 14. The first flow diverter 64 and the second flow diverter 66 are configured to permit the coolant to flow through the thermal storage loop 38 and the secondary engine bypass loop 62 and militate against the coolant flowing between the secondary engine bypass loop 62 and the thermal storage loop 38.

With continuing reference to FIG. 3, the fluid mover 42 causes the coolant to flow through the coolant circuit 14. A direction of the flow of coolant is indicated by arrows. The coolant heat exchanger 34 transfers heat to the air flowing through the housing 26 from the coolant flowing through the coolant circuit 14 to cool the coolant flowing through the coolant circuit 14. The cooled coolant is conveyed through the second segment 48 of the coolant circuit 14 through the auxiliary heat exchanger 50. The auxiliary heat exchanger 50 transfers heat from the coolant conveyed from the coolant source 54 to the WCAC 52 to the coolant flowing through the coolant circuit 14 to cool the coolant received by the WCAC 52. The WCAC 52 uses the cooled coolant to cool the charge air received therein.

Concurrently, the coolant is conveyed through the secondary engine bypass loop 62 between the heater core 32 and the engine 11 in a direction indicated by the arrows. The pump (not shown) of the engine coolant circuit can be used to cause the coolant to flow through the secondary engine bypass loop 62. However, an additional fluid mover, such as electric pump, can also be used to convey the coolant through the secondary engine bypass loop 62. Heat from the engine 11 is used to heat the coolant conveyed through the heater core 32. The fan 30 causes the air to be conveyed through the housing 26 to the passenger compartment. Heat is transferred from the coolant to the air flowing through the housing 26.

Figure 4:
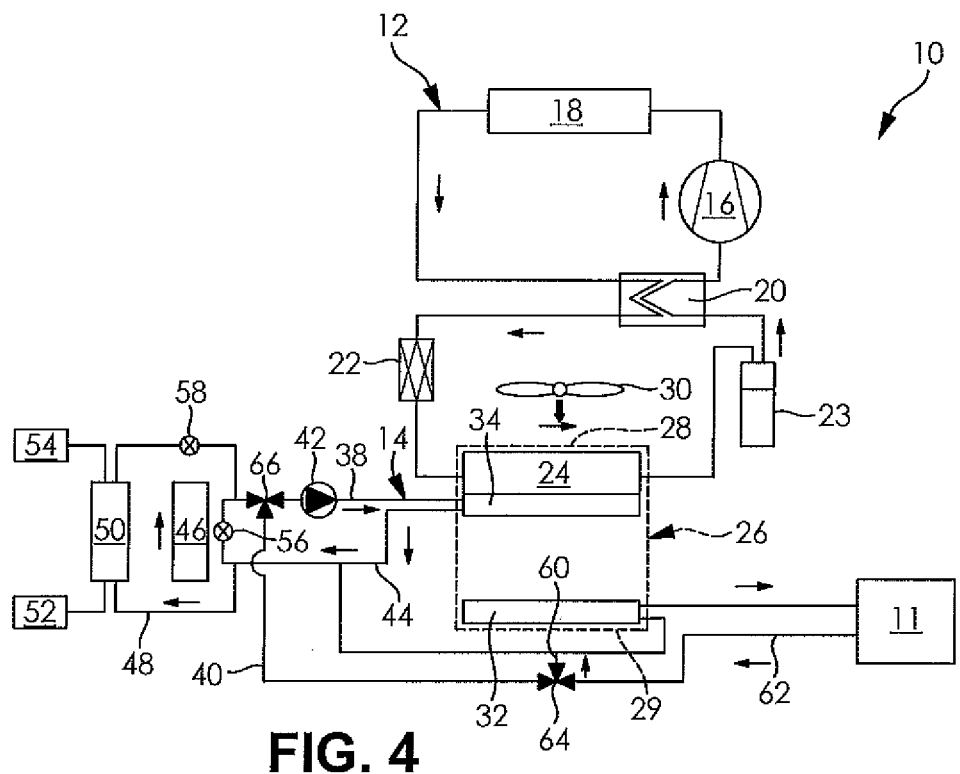
FIG. 4 is a schematic flow diagram of the HVAC thermal energy storage system of FIG. 1, operating in a mixed heating and cooling mode.

FIG. 4 illustrates the thermal energy storage system 10 operating in the mixed mode according to an embodiment of the disclosure. The refrigerant circuit 12 is operating to condition the air conveyed through the housing 26 to cool and dehumidify the passenger compartment. The refrigerant is conveyed through the components of the refrigerant circuit 12 (the compressor 16, the condenser 18, the internal heat exchanger 20, the expansion valve 22, the evaporator 24, the accumulator 23) in a direction indicated by the arrows. Concurrently, the fan 30 causes the air to be conveyed through the housing 26 to the passenger compartment. The evaporator 24 transfers heat from the air through the housing 26 to the refrigerant flowing through the refrigerant circuit 12 to cool and dehumidify the air.

The first valve 56 of the coolant circuit 14 is closed to militate against heat exchange communication between the cold storage device 46 and the coolant circuit 14. The first flow diverter 64 and the second flow diverter 66 are configured to permit the coolant to flow through the thermal storage loop 38 and the secondary engine bypass loop 62 and militate against the coolant flowing between the secondary engine bypass loop 62 and the thermal storage loop 38.

With continuing reference to FIG. 4, the fluid mover 42 causes the coolant to flow through the coolant circuit 14. A direction of the flow of coolant is indicated by arrows. The coolant heat exchanger 14 transfers heat to the air flowing through the housing 26 from the coolant flowing through the coolant circuit 14 to cool the coolant flowing through the coolant circuit 14. The cooled flow of coolant is conveyed through the second segment 48 of the coolant circuit 14 through the auxiliary heat exchanger 48. The auxiliary heat exchanger 50 transfers heat from the coolant conveyed from the coolant source 54 to the WCAC 52 to the coolant flowing through the coolant circuit 14 to cool the coolant received by the WCAC 52. The WCAC 52 uses the cooled coolant to cool the charge air received therein.

Concurrently, the coolant is conveyed through the secondary engine bypass loop 62 between the heater core 32 and the engine 11 in a direction indicated by the arrows. The pump (not shown) of the engine coolant circuit can be used to cause the coolant to flow through the secondary engine bypass loop 62. However, an additional fluid mover, such as electric pump, can also be used to convey the coolant through the secondary engine bypass loop 62. Heat from the engine is used to heat the coolant conveyed through the heater core 32. The cooled air from the evaporator 24 is received by the heater core 32. Heat is transferred from the coolant flowing through the heater core 32 to the air flowing through the housing 26 to reheat the cooled and dehumidified air flowing through the housing 26.

Advantageously, the thermal energy storage system 10 uses components of a vehicle such the refrigeration circuit 12 and the coolant circuit 14 to provide multiple functions such as storing thermal energy in a cold storage device 46, improving the cooling efficiency of the WCAC 52, and efficiently conditioning the air conveyed to the passenger compartment. The thermal energy storage system 10 provides multiple function with minimal complexity and minimal cost. The thermal energy storage system 10 increases efficiency of the HVAC system of the vehicle, the WCAC 52 of the charge air circuit of the vehicle, and the overall fuel economy during the cooling mode, the heating mode, and the mixed-mode of the thermal energy storage system 10. The thermal energy storage system 10 can be employed to provide about 45 seconds to 60 seconds of conditioned air to the passenger compartment during an engine stop. The thermal energy storage system 10 can also be employed to decrease the charge air temperature conveyed from the WCAC 52 by 3° C. to 5° C. and to improve fuel economy of 2% to 4%.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A thermal energy storage system of a vehicle comprising:
   a refrigerant circuit conveying a refrigerant therethrough, the refrigerant circuit including an evaporator receiving a flow of the refrigerant therethrough and a flow of air therethrough;
   a coolant circuit conveying a coolant therethrough, the coolant circuit including a coolant heat exchanger disposed downstream from the evaporator with respect to a direction of the flow of air through the evaporator and an auxiliary heat exchanger receiving a flow of the coolant therethrough, wherein the coolant circuit is in fluid communication with an engine of the vehicle;
   a cold storage device in thermal communication with the coolant circuit, wherein the coolant circuit includes:
      a thermal storage loop having a first segment in heat exchange communication with the cold storage device and a second segment in fluid communication with the auxiliary heat exchanger;
      an engine bypass loop bypassing the second segment and having a bypass for forming a secondary engine bypass loop fluidly separate from the thermal storage loop;
      a first flow diverter controlling the flow of coolant though the bypass and the engine bypass loop; and
      a second flow diverter controlling the flow of the coolant through the thermal storage loop and through the engine bypass loop;
   a water-cooled charge air cooler in fluid communication with the auxiliary heat exchanger; and
   a heater core disposed downstream from the evaporator with respect to the direction of the flow of air through the evaporator.

2. The thermal energy storage system of claim 1, wherein the coolant heat exchanger is integrally formed with the evaporator.

3. The thermal energy storage system of claim 1, wherein the coolant heat exchanger is separate from the evaporator.

4. The thermal energy storage system of claim 1, wherein the heater core is in fluid communication with the coolant circuit.

5. The thermal energy storage system of claim 1, wherein the evaporator, the coolant heat exchanger, and the heater core are disposed in a housing.

6. The thermal energy storage system of claim 1, wherein the coolant circuit is in fluid communication with the cold storage device.

7. The thermal energy storage system of claim 1, wherein the cold storage device includes a phase change material.

8. The thermal energy storage system of claim 1, wherein the coolant circuit includes a first valve disposed therein, the first valve configured to control the flow of the coolant through a portion of the thermal storage loop in thermal communication with the cold storage device.

9. The thermal energy storage system of claim 8, wherein the coolant circuit includes a second valve disposed therein, the second valve configured to control the flow of the coolant to the auxiliary heat exchanger.

10. The method of claim 9, further comprising the step of directing the flow of coolant through the heater core and the engine during at least one of a heating mode of the thermal energy storage system and a mixed-mode of the thermal energy storage system.

11. The method of claim 9, wherein the evaporator, the coolant heat exchanger, and the heater core are disposed in a housing.

12. A method for operating a thermal energy storage system of a vehicle, comprising the steps of:
   providing a refrigerant circuit conveying a refrigerant therethrough, the refrigerant circuit including an evaporator receiving a flow of the refrigerant therethrough and a flow of air therethrough;
   disposing a coolant heat exchanger downstream from the evaporator with respect to a direction of the flow of air through the evaporator, the coolant heat exchanger receiving a flow of coolant therethrough;
   transferring heat between the air and the coolant received by the coolant heat exchanger;
   providing a coolant circuit in fluid communication with the coolant heat exchanger, the coolant circuit including a heater core disposed downstream from the evaporator with respect to the direction of the flow of air through the evaporator, an engine, and an auxiliary heat exchanger;
   disposing a cold storage device in thermal communication with a portion of the coolant circuit;
      wherein the coolant circuit further includes:
         a thermal storage loop having a first segment in heat exchange communication with the cold storage device and a second segment in fluid communication with the auxiliary heat exchanger;
         an engine bypass loop bypassing the second segment and having a bypass for forming a secondary engine bypass loop fluidly separate from the thermal storage loop;
         a first flow diverter controlling the flow of coolant though the bypass and the engine bypass loop; and
         a second flow diverter controlling the flow of the coolant through the thermal storage loop and through the engine bypass loop;
   disposing a water-cooled charge air cooler in fluid communication with the auxiliary heat exchanger; and
   directing the coolant to flow through at least one of the auxiliary heat exchanger, the heater core, and the engine.

13. The method of claim 12, further comprising the steps of:

directing the coolant to flow through the portion of the coolant circuit in thermal communication with the cold storage device during a cooling mode of the thermal energy storage system; and transferring heat between the cold storage device and the coolant during the cooling mode.

14. A method for operating a thermal energy storage system of a vehicle, comprising the steps of:

providing a refrigerant circuit conveying a refrigerant therethrough, the refrigerant circuit including an evaporator receiving a flow of the refrigerant therethrough and a flow of air therethrough;

disposing a coolant heat exchanger downstream from the evaporator with respect to a direction of the flow of air through the evaporator, the coolant heat exchanger receiving a flow of coolant therethrough;

transferring heat between the air and the coolant received by the coolant heat exchanger;

providing a coolant circuit in fluid communication with the coolant heat exchanger, the coolant circuit including a heater core disposed downstream from the evaporator with respect to the direction of the flow of air through the evaporator, an engine, and an auxiliary heat exchanger;

disposing a water-cooled charge air cooler in fluid communication with the auxiliary heat exchanger and a cold storage device in thermal communication with a portion of the coolant circuit;

wherein the coolant circuit further includes:

a thermal storage loop having a first segment in heat exchange communication with the cold storage device and a second segment in fluid communication with the auxiliary heat exchanger;

an engine bypass loop bypassing the second segment and having a bypass for forming a secondary engine bypass loop fluidly separate from the thermal storage loop;

a first flow diverter controlling the flow of coolant though the bypass and the engine bypass loop; and a second flow diverter controlling the flow of the coolant through the thermal storage loop and through the engine bypass loop; and directing the coolant to flow through at least one of the auxiliary heat exchanger, the portion of the coolant circuit in thermal communication with the cold storage device, the heater core, and the engine.

\* \* \* \* \*